United States Patent
Tsuneyoshi et al.

(10) Patent No.: US 9,106,110 B2
(45) Date of Patent: Aug. 11, 2015

(54) POWER GENERATING DEVICE AND SWITCH

(71) Applicants: Nobutaka Tsuneyoshi, Tokyo (JP); Ryoichi Annen, Tokyo (JP); Minenori Nagasaka, Tokyo (JP)

(72) Inventors: Nobutaka Tsuneyoshi, Tokyo (JP); Ryoichi Annen, Tokyo (JP); Minenori Nagasaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 204 days.

(21) Appl. No.: 13/861,465

(22) Filed: Apr. 12, 2013

(65) Prior Publication Data

US 2013/0270943 A1    Oct. 17, 2013

(30) Foreign Application Priority Data

Apr. 16, 2012  (JP) ................................. 2012-093427
Mar. 29, 2013  (JP) ................................. 2013-072190

(51) Int. Cl.
*H02K 7/06* (2006.01)
*H02K 7/116* (2006.01)
(Continued)

(52) U.S. Cl.
CPC .................. *H02K 7/06* (2013.01); *H02K 7/116* (2013.01); *H02K 7/1853* (2013.01); *H01H 23/16* (2013.01); *Y02B 70/3241* (2013.01)

(58) Field of Classification Search
CPC ......... H02K 7/06; H02K 7/1853; H02K 7/18; H02K 7/065; H02K 7/116; H02K 33/16; H02K 33/04; H02K 7/006; H02K 7/1025; G01N 27/002; H01H 23/16; Y02B 70/3241

USPC .............. 310/80, 20, 83, 99, 36, 15, 17, 117, 310/118, 121; 290/1 C, 1 E
See application file for complete search history.

(56) References Cited

U.S. PATENT DOCUMENTS 1,621,469 A * 3/1927 Remy .............................. 310/15
4,951,915 A * 8/1990 Piao ................................ 251/14
7,988,319 B2 * 8/2011 Liao ............................. 362/192
(Continued)

FOREIGN PATENT DOCUMENTS

JP       2003-534704        11/2003
WO    WO 2012096314 A1 *   7/2012

OTHER PUBLICATIONS

Kaneko, Toshio; Tsuneyoshi, Nobutaka, Power Generation Apparatus and Switch, Mitsumi Electric Co., Ltd., WO/2012/096314, Jan. 1, 2012.*

*Primary Examiner* — Terrance Kenerly
*Assistant Examiner* — Alexander Singh
(74) *Attorney, Agent, or Firm* — IPUSA, PLLC

(57) ABSTRACT

A power generating device includes a power generating part, a sliding member, first, second and third elastic parts, and a connecting member. When the sliding member is caused to move to a first storage completion position by an operation that causes the connecting member to rotate, the connecting member and the sliding member are disconnected so that the sliding member is caused to move in a first direction by an elastic force stored in the second elastic part. The connecting member is caused to rotate by an elastic force stored in the third elastic part. When the sliding member is caused to move to a second storage completion position by the third elastic part, the connecting member and the sliding member are disconnected so that the sliding member is caused to move in a second direction by an elastic force stored in the first elastic part.

6 Claims, 13 Drawing Sheets

(51) Int. Cl.
*H02K 7/18* (2006.01)
*H01H 23/16* (2006.01)

(56) References Cited

U.S. PATENT DOCUMENTS

| | | | |
|---|---|---|---|
| 8,253,283 B2 * | 8/2012 | Bataille et al. | 310/36 |
| 8,907,507 B2 * | 12/2014 | Tsuneyoshi | 290/1 E |
| 2003/0143963 A1 | 7/2003 | Pistor et al. | |
| 2004/0046462 A1 * | 3/2004 | Chen | 310/20 |
| 2007/0090703 A1 * | 4/2007 | Yeh | 310/83 |
| 2008/0220636 A1 * | 9/2008 | Champion et al. | 439/131 |
| 2010/0013241 A1 * | 1/2010 | Yeh | 290/1 C |
| 2010/0117462 A1 * | 5/2010 | Wang et al. | 310/20 |
| 2011/0245736 A1 * | 10/2011 | Foehrenbach | 601/4 |
| 2013/0270092 A1 * | 10/2013 | Kaneko et al. | 200/501 |

* cited by examiner

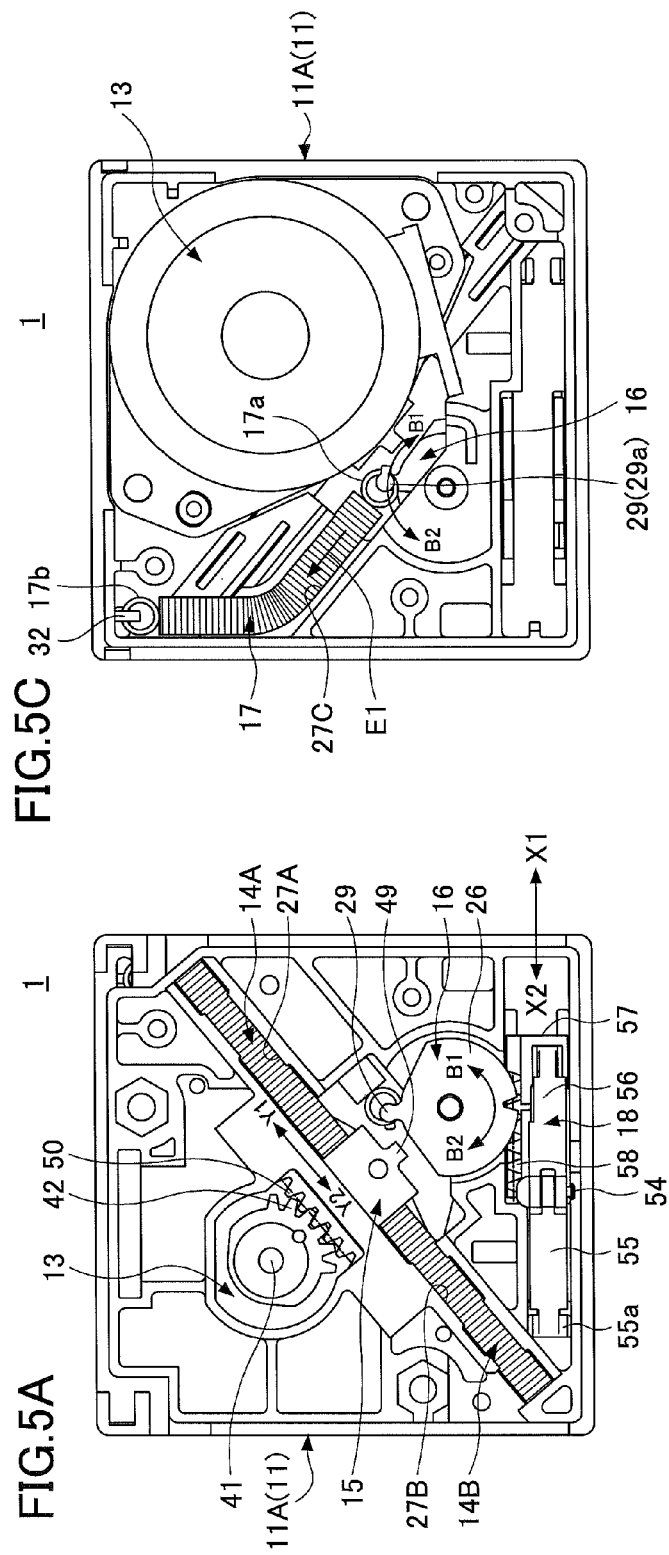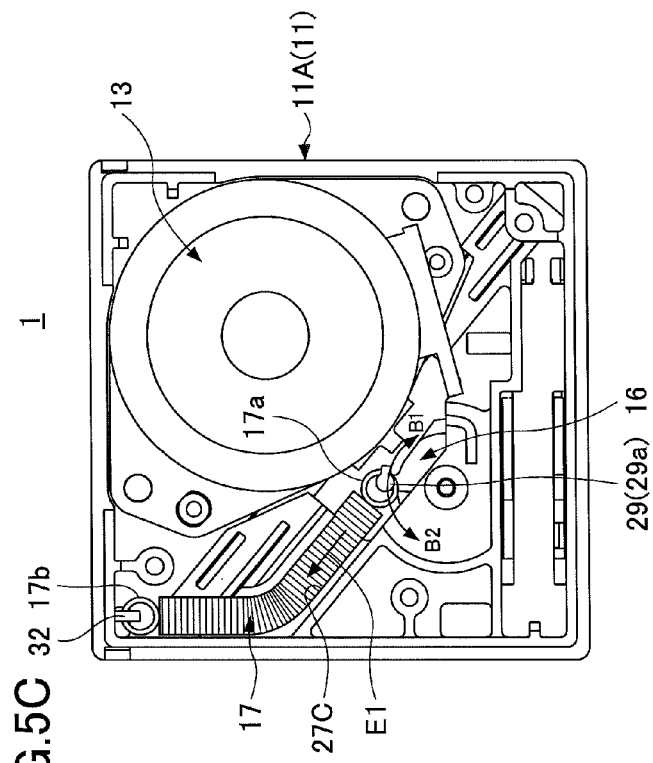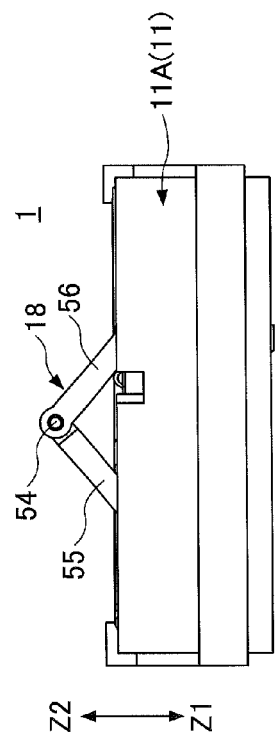

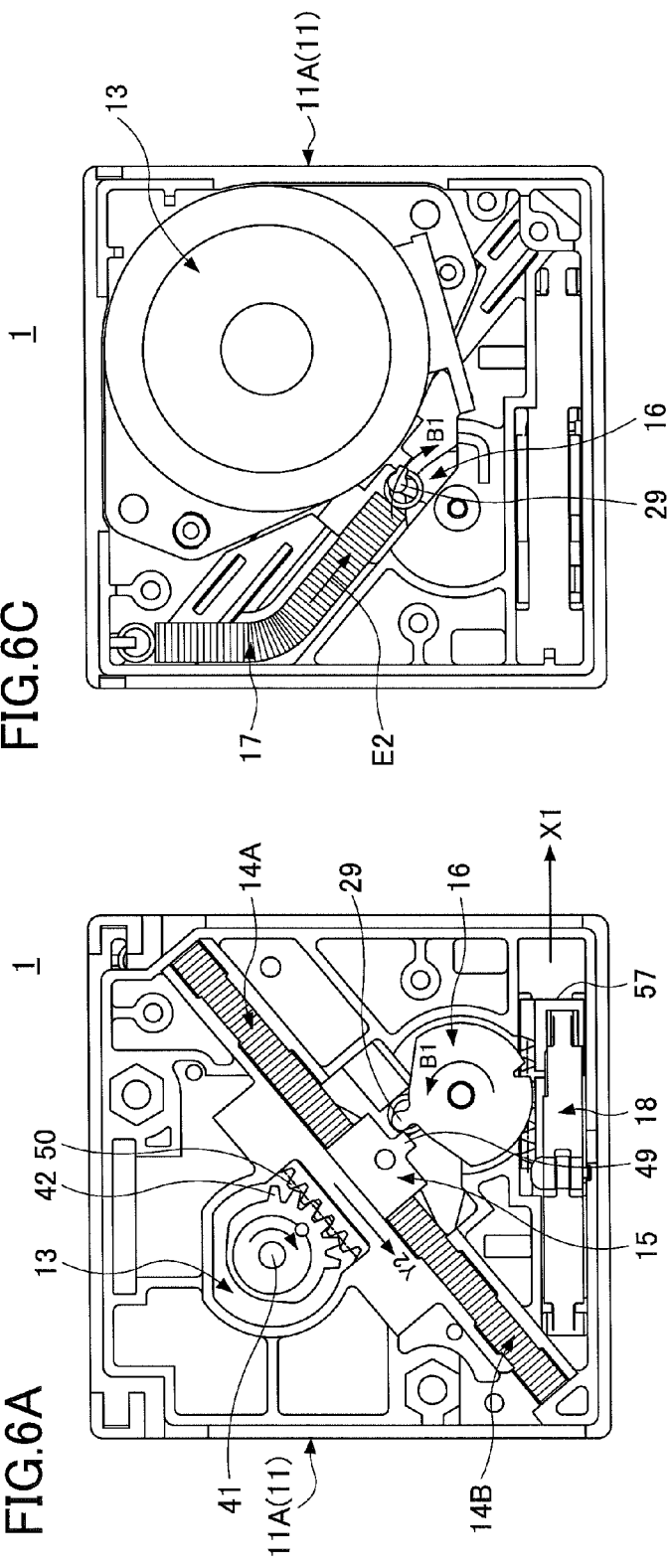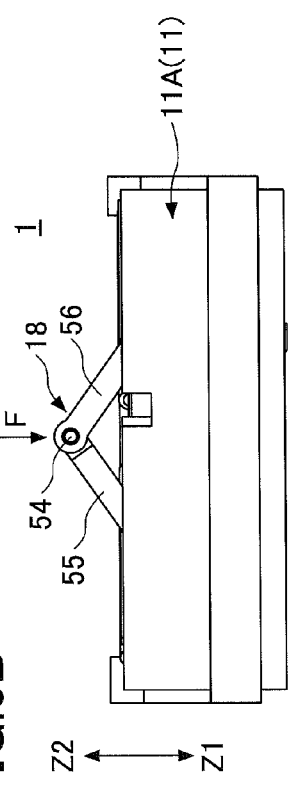

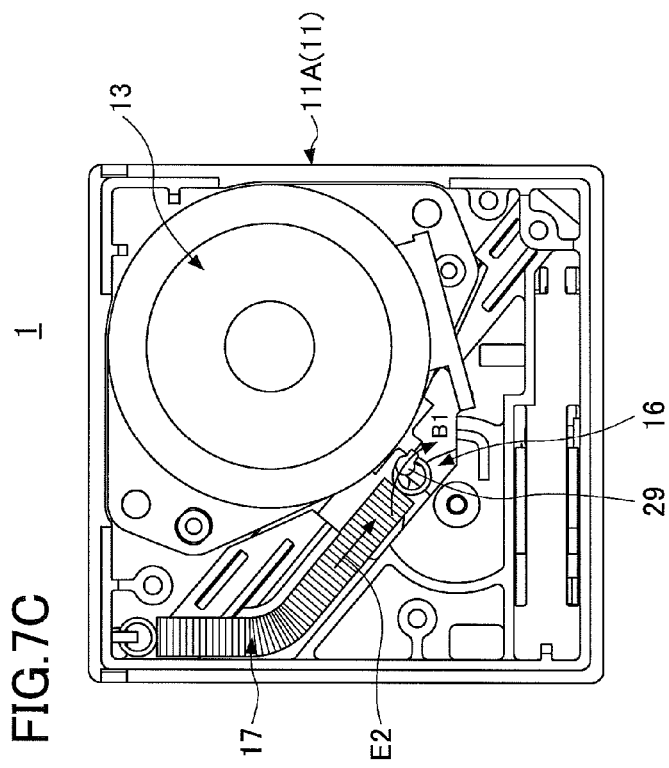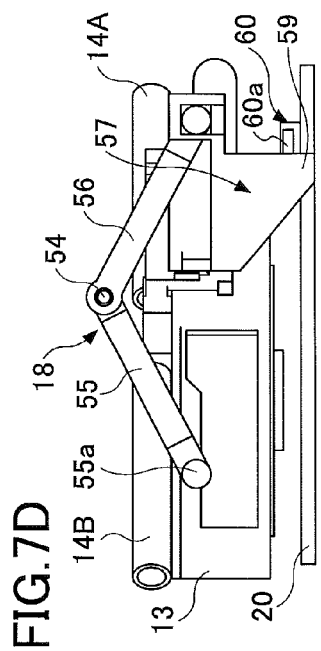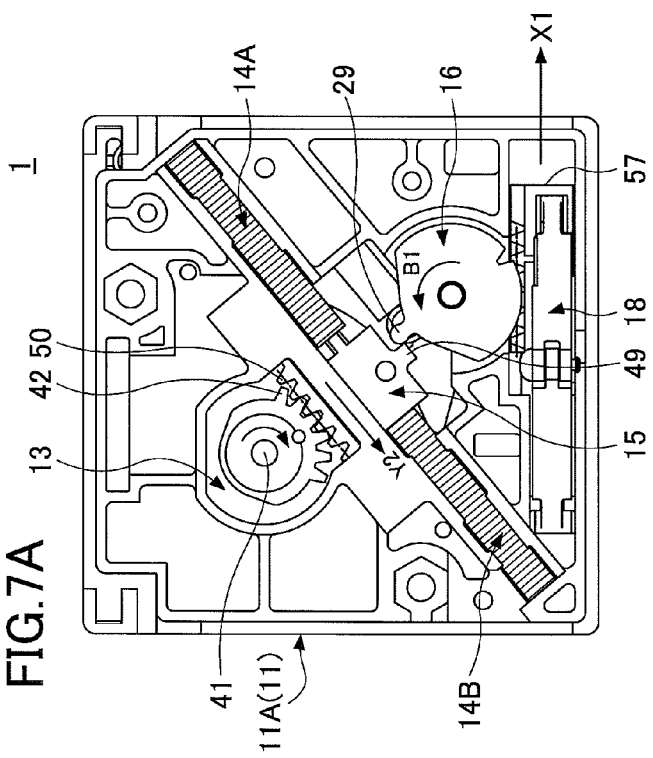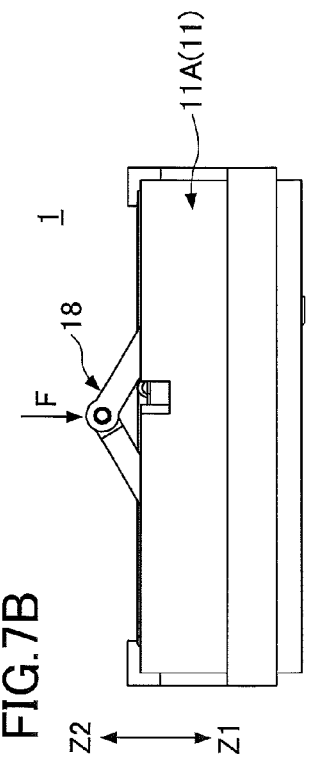

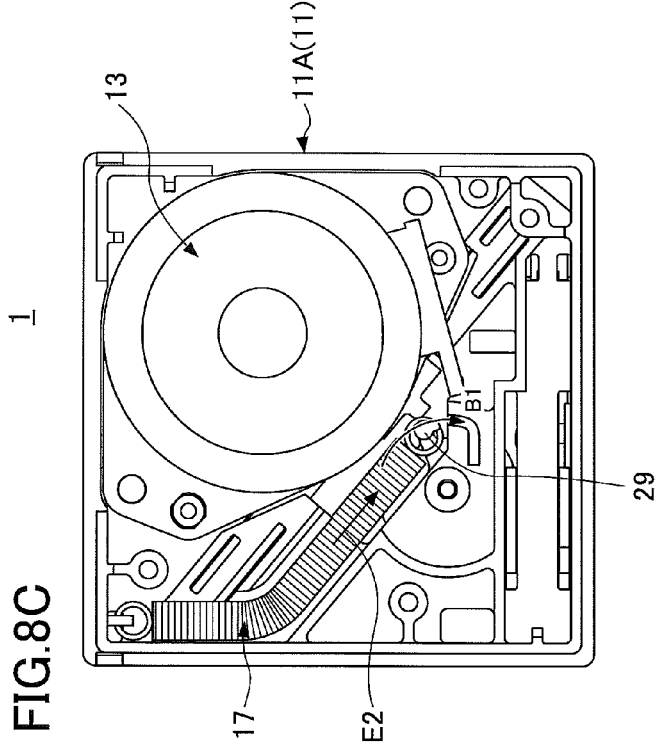
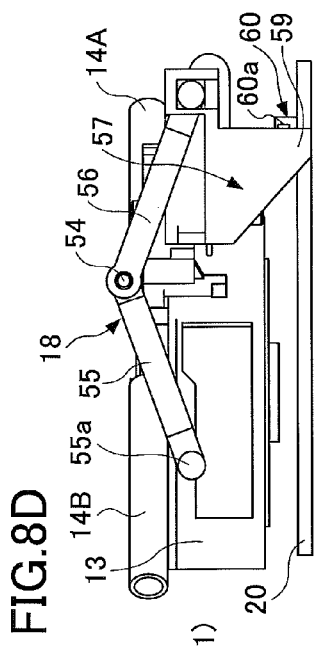
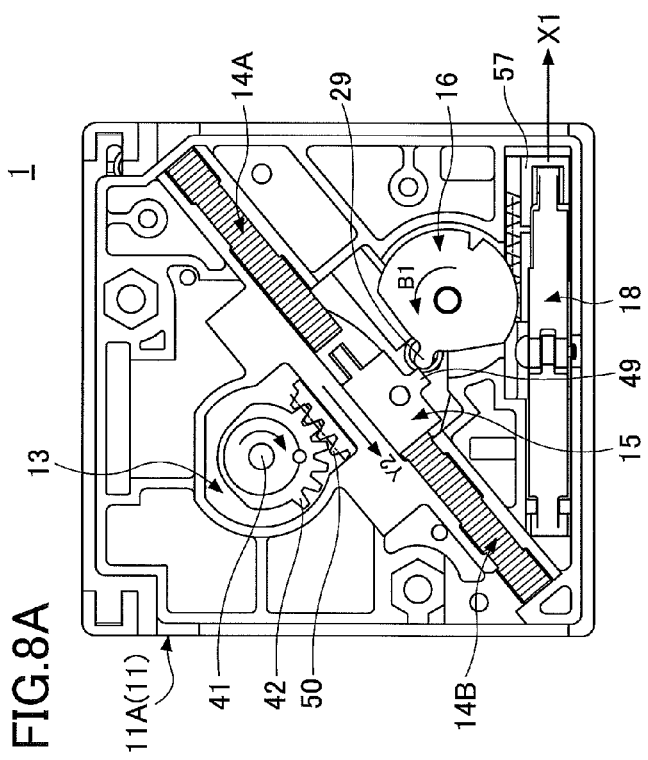
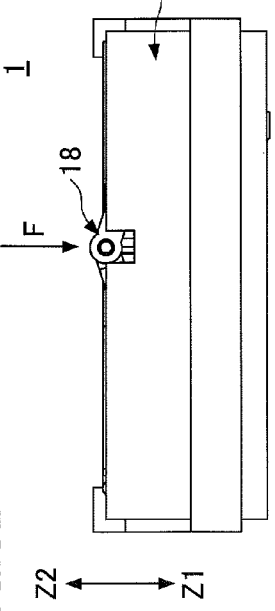
FIG.8A
FIG.8B
FIG.8C
FIG.8D

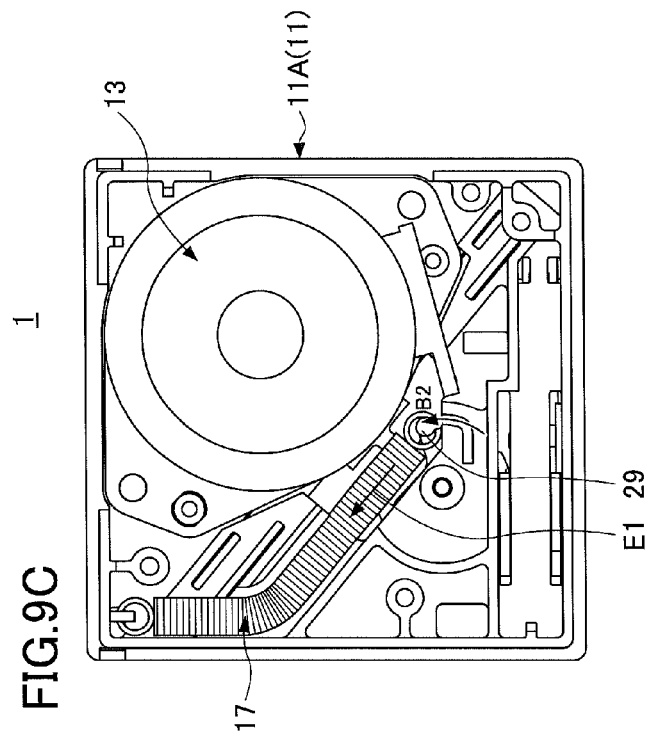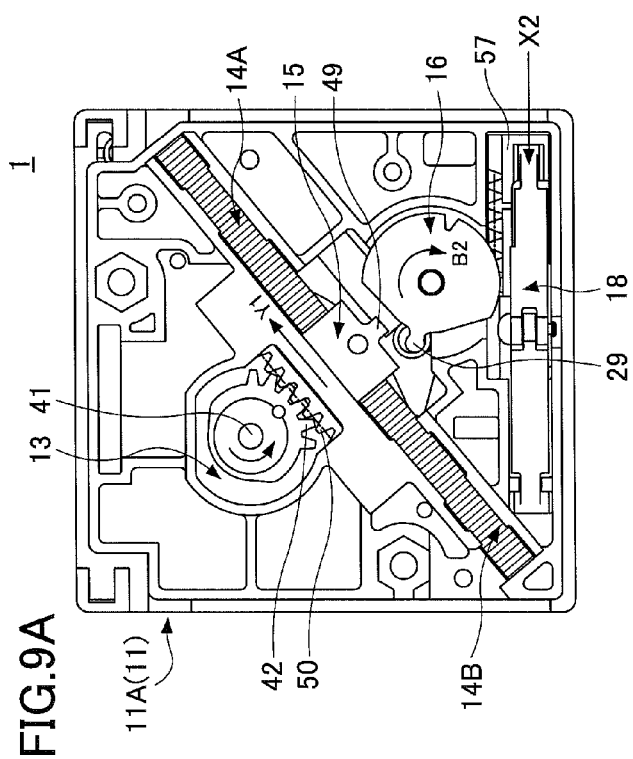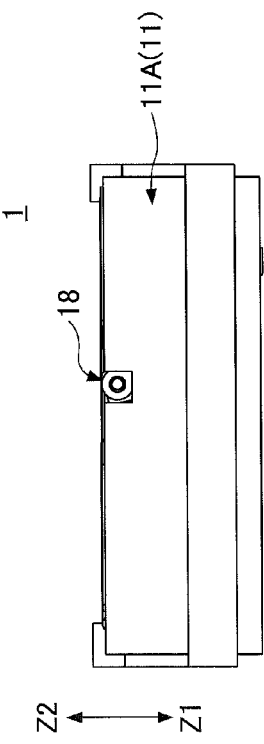

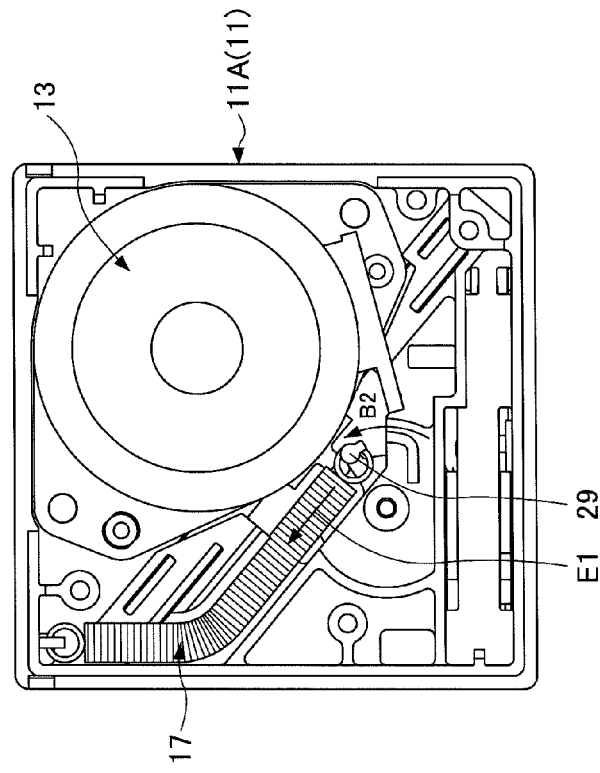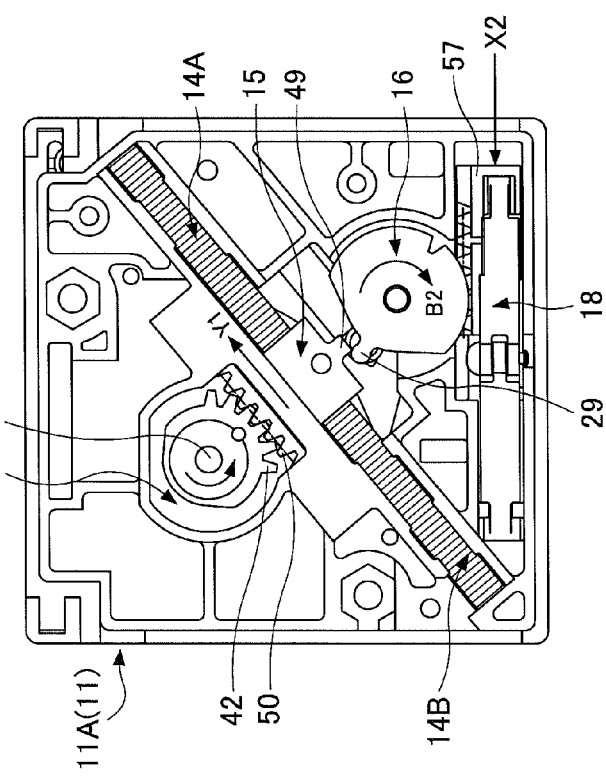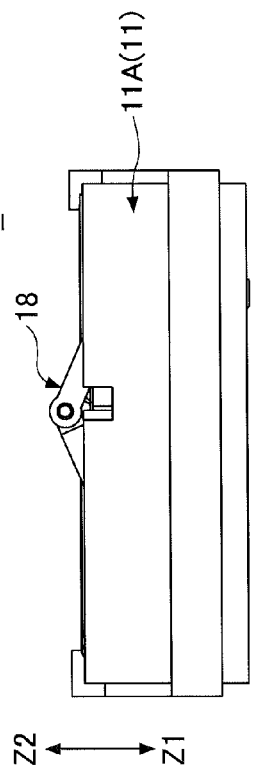

POWER GENERATING DEVICE AND SWITCH

CROSS-REFERENCE TO RELATED APPLICATIONS

This application is based upon and claims the benefit of priority of Japanese Patent Applications No. 2012-093427, filed on Apr. 16, 2012, and No. 2013-072190, filed on Mar. 29, 2013, the entire contents of which are incorporated herein by reference.

BACKGROUND OF THE INVENTION

1. Field of the Invention

The present invention relates generally to a power generating device and a switch, and more particularly to a power generating device that is caused to generate electric power by an operation of a switch lever and to a switch using the power generating device.

2. Description of the Related Art

For example, a wireless switch is known as a switch that turns on and off an electrical apparatus such as a lighting apparatus. The wireless switch, which may be placed at hand, is convenient compared with a stationary switch fixed to a wall or the like.

A dry cell may be used as the power supply of the wireless switch. In the case of a dry cell, however, it is troublesome to replace the dry cell, thus reducing the usability of the wireless switch. Therefore, it has been proposed to improve the usability of a wireless switch by providing a power generating device in the wireless switch. (See Japanese National Publication of International Patent Application No. 2003-534704.)

Further, in order for the conventional wireless switch to generate the outputs of two switch operations (for example, the output of a turn-on operation and the output of a turn-off operation), the two switch operations have to be separately performed, so that it is necessary to operate the operation knob of the wireless switch twice.

SUMMARY OF THE INVENTION

According to an aspect of the present invention, a power generating device includes a case; an operating member to be operated at a time of power generation; a power generating part configured to cause an induced electromotive force to be generated in response to a driving of a driven part thereof; a sliding member configured to move in first and second different directions in the case and to drive the driven part by moving in the first direction or the second direction; a first elastic part configured to be caused to store an elastic force by a movement of the sliding member in the first direction; a second elastic part configured to be caused to store an elastic force by a movement of the sliding member in the second direction; a connecting member configured to be connected to and disconnected from the sliding member, and to cause the sliding member to move in the second direction and the first direction by rotating in a forward direction and a reverse direction, respectively, with the sliding member being connected thereto; and a third elastic part connected to the connecting member and configured to be caused to store an elastic force by the connecting member rotating with the movement of the sliding member in the second direction, wherein the connecting member is caused to rotate in the forward direction by an operation of the operating member, and when the sliding member is caused to move to a first storage completion position by the operation of the operating member, the connecting member and the sliding member are disconnected so that the sliding member is caused to move in the first direction by the elastic force stored in the second elastic part, and wherein the connecting member is caused to rotate in the reverse direction by the elastic force stored in the third elastic part, and when the sliding member is caused to move to a second storage completion position by the third elastic part, the connecting member and the sliding member are disconnected so that the sliding member is caused to move in the second direction by the elastic force stored in the first elastic part.

According to an aspect of the present invention, a switch includes the power generating device as set forth above; and an electronic circuit configured to operate with the induced electromotive force caused to be generated by the power generating device.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIGS. 5A, 5B and 5C are a plan view, a front view, and a bottom view, respectively, of the power generating device and the switch, which are embodiments of the present invention, for illustrating their operations;

FIGS. 6A, 6B and 6C are a plan view, a front view, and a bottom view, respectively, of the power generating device and the switch, which are embodiments of the present invention, for illustrating their operations;

FIGS. 7A, 7B, 7C and 7D are a plan view, a front view, a bottom view, and an interior view, respectively, of the power generating device and the switch, which are embodiments of the present invention, for illustrating their operations;

FIGS. 8A, 8B, 8C and 8D are a plan view, a front view, a bottom view, and an interior view, respectively, of the power generating device and the switch, which are embodiments of the present invention, for illustrating their operations;

FIGS. 9A, 9B and 9C are a plan view, a front view, and a bottom view, respectively, of the power generating device and the switch, which are embodiments of the present invention, for illustrating their operations;

FIGS. 10A, 10B and 10C are a plan view, a front view, and a bottom view, respectively, of the power generating device and the switch, which are embodiments of the present invention, for illustrating their operations;

DETAILED DESCRIPTION OF THE PREFERRED EMBODIMENTS

As described above, in order for the conventional wireless switch to generate the outputs of two switch operations, the operation knob of the wireless switch has to be operated twice. This configuration has the problem of troublesome operations.

According to an aspect of the present invention, a power generating device and a switch are provided that are improved in operability.

According to an aspect of the present invention, it is possible to perform power generation twice with a single operation of an operating member, so that it is possible to improve operability.

Next, a description is given, with reference to the accompanying drawings, of embodiments of the present invention.

FIG. 1 through FIGS. 4A and 4B are diagrams for illustrating a configuration of a switch and a configuration of a power generating device that are embodiments of the present invention. FIGS. 5A-5C through FIGS. 11A-11C are diagrams for illustrating operations of a switch and a power generating device that are embodiments of the present invention.

Figure 1:
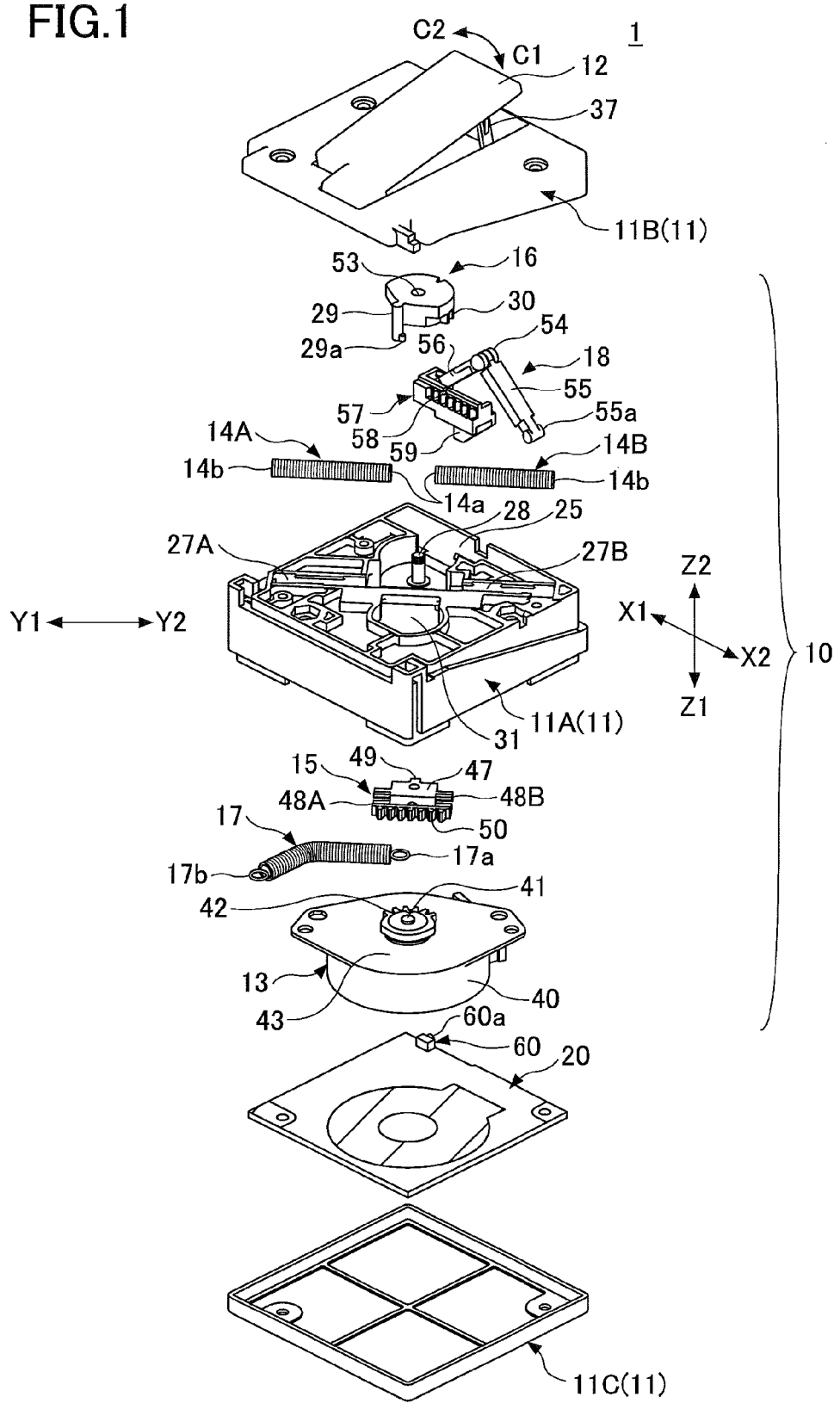
FIG. 1 is an exploded perspective view of a power generating device and a switch that are embodiments of the present invention.
Figure 2:
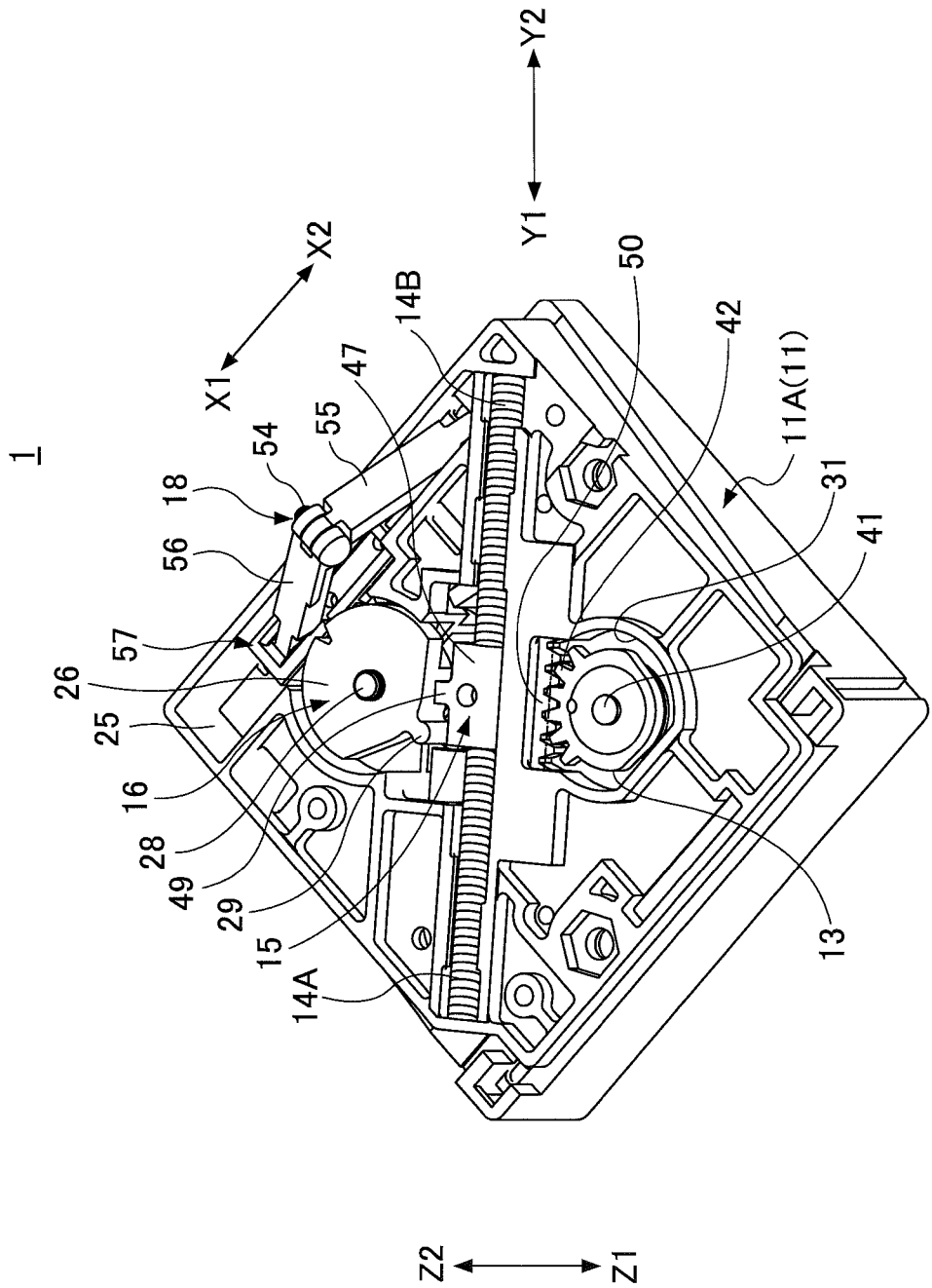
FIG. 2 is a top-side perspective view of the power generating device and the switch that are embodiments of the present invention.

Referring to FIG. 1, a switch 1, which is a wireless switch, includes a power generating device 10 and a circuit board 20. The power generating device 10 generates electric power in response to an operation of a switch lever 12 described below.

Figure 3:
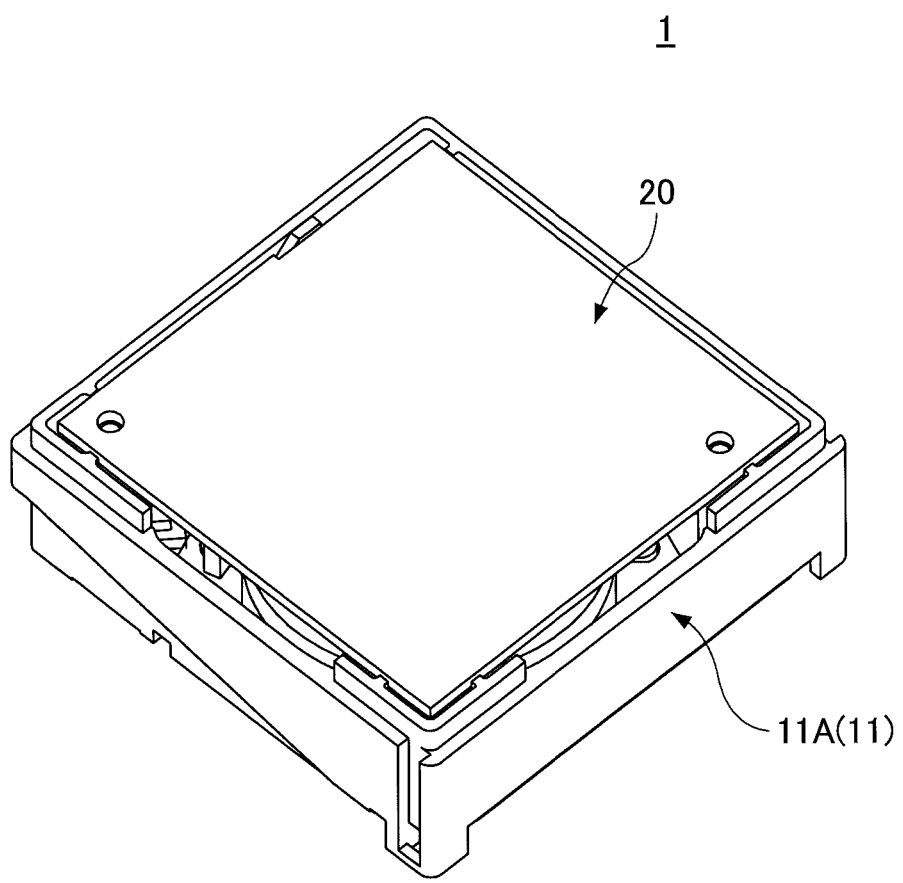
FIG. 3 is a bottom-side perspective view of the power generating device and the switch that are embodiments of the present invention.

Further, an electronic circuit (not graphically illustrated) such as a high-frequency communications circuit is provided on the circuit board 20, and is configured to operate with electric power (an induced electromotive force) generated by the power generating device. The high-frequency communications circuit operates to transmit a radio wave of the 2.4 GHz band to an electrical apparatus (such as a lighting apparatus). As illustrated in FIG. 3, the circuit board 20 is provided on the backside of a case body 11A.

The power generating device 10 includes a case 11, the switch lever 12, a power generator 13, a first power generating spring 14A, a second power generating spring 14B, a sliding member 15, a pinwheel 16, a pinwheel spring 17, and a toggle mechanism 18.

The case 11, which is a resin molded product, includes the case body 11A, a top cover 11B, and a bottom cover 11C. The top cover 11B is attached to the top side of the case body 11A and the bottom cover 11C is attached to the bottom side (backside) of the case body 11A, so that the case 11 forms a rectangular enclosure as a whole.

The case body 11A includes a toggle attachment part 25 for attaching the toggle mechanism 18, a first spring accommodating part 27A and a second spring accommodating part 27B for attaching the first power generating spring 14A and the second power generating spring 14B, respectively, and an opening 31 for attaching the power generator 13, all of which are formed on the top side of the case body 11A. The case body 11A further includes a third spring accommodating part 27C (FIG. 5C) for attaching the pinwheel spring 17, which is formed on the bottom side of the case body 11A.

The switch lever 12 may correspond to an operating member. The switch lever 12 is provided in the top cover 11B so as to be able to swing in directions indicated by arrows C1 and C2 in FIG. 1.

Further, an engaging projecting part 37 that projects inside the case 11 is provided on the backside of the switch lever 12. Accordingly, as the switch lever 12 swings, the engaging projecting part 37 also swings in the C1 and the C2 direction. The switch lever 12 is pressed by a user who uses the switch 1.

The power generator 13 may correspond to a power generating part. The power generator 13 includes a metal base 43 and a generator body 40.

Further, the power generator 13 includes a driven shaft 41 (a driven part), which projects upward from the base 43. The power generator 13 is a motor generator. Therefore, causing the rotation of the driven shaft 41 causes a magnet to rotate inside an internally provided coil, so that the power generator 13 causes an induced electromotive force to be generated (generates electric power).

The opening is formed in part of the case body 11A where the power generator 13 is attached. With the power generator 13 being fixed to the case body 11A, the driven shaft 41 is positioned inside the opening 31. Further, a gear 42 that meshes with a rack 50 described below is fixed to the driven shaft 41.

The first and second power generating springs 14A and 14B may correspond to first and second elastic parts, respectively. The first power generating spring 14A is attached to the first spring accommodating part 27A formed in the case body 11A. The second power generating spring 14B is attached to the second spring accommodating part 27B formed in the case body 11A. These first and second power generating springs 14A and 14B are provided across the sliding member 15 described below from each other.

Further, each of the first and second power generating springs 14A and 14B has an inside end 14a attached to the sliding member 15 and has an outside end 14b abutting against an interior wall surface of the case body 11A. Further, each of the first and second power generating springs 14A and 14B is configured to be compressed to store an elastic force, and to output (release) this stored elastic force to cause the driven shaft 41 of the power generator 13 to rotate, thereby causing an induced electromotive force to be generated (generating electric power) as described below.

In this embodiment, coil springs, which are compression springs, are used as the first and second power generating springs 14A and 14B, while springs other than coil springs, elastic members such as rubber, and air cylinders may also be used as long as they are capable of storing a predetermined elastic force (elastic energy) to be described below.

The sliding member 15, which is a resin molded product, has a unitary structure including a body part 47, a first connecting part 48A, a second connecting part 48B, an engaging projection 49, and the rack 50. The sliding member 15 is allowed to move in directions indicated by arrows Y1 and Y2 in FIG. 1 and FIG. 2 in the case body 11A.

The engaging projection 49 is configured to be engageable with the pinwheel 16 described below. The rack 50 that extends in the Y1 and the Y2 direction is formed on the body part 47. The rack 50 is configured to mesh with the gear 42 provided on the driven shaft 41 of the power generator 13.

As a result, the power generator 13 and the sliding member 15 are connected via the gear 42 and the rack 50. Accordingly, when the sliding member 15 moves in the Y1 or the Y2 direction, the sliding member 15 causes the driven shaft 41 to rotate via the rack 50 and the gear 42, so that the power generator 13 causes an induced electromotive force to be generated.

Further, the first connecting part 48A is formed in one end portion of the sliding member 15 (at one end of the body part 47) and the second connecting part 48B is formed in another end portion of the sliding member 15 (at another end of the body part 47). The first connecting part 48A is fit into the inside end 14a of the first power generating spring 14A. As a result, the sliding member 15 and the first power generating spring 14A are connected. Further, the second connecting part 48B is fit into the inside end 14a of the second power generating spring 14B. As a result, the sliding member 15 is connected to the second power generating spring 14B.

Accordingly, with the first and second connecting parts 48A and 48B being connected to the first and second power generating springs 14A and 14B, respectively, the sliding member 15 is sandwiched between the first power generating spring 14A and the second power generating spring 14B.

Thus, the sliding member 15 is held between the paired first and second power generating springs 14A and 14B. Therefore, when the sliding member 15 moves in the Y1 direction, the first power generating spring 14A is compressed to store an elastic force, and when the sliding member 15 moves in the Y2 direction, the second power generating spring 14B is compressed to store an elastic force.

Meanwhile, when the elastic force stored in the first power generating spring 14A is released, the sliding member 15 instantaneously moves in the Y2 direction to cause the driven shaft 41 to be rotationally urged via the rack 50 and the gear 42, so that the power generator 13 causes an induced electromotive force to be generated. Further, when the elastic force stored in the second power generating spring 14B is released, the sliding member 15 instantaneously moves in the Y1 direction to cause the driven shaft 41 to be rotationally urged via the rack 50 and the gear 42, so that the power generator 13 causes an induced electromotive force to be generated.

At this point, the direction in which the sliding member 15 moves when the first power generating spring 14A releases the stored elastic force and the direction in which the sliding member 15 moves when the second power generating spring 14B releases the stored elastic force are opposite to each other. Therefore, the rotation direction in which the driven shaft 41 is rotationally urged by the sliding member 15 when the first power generating spring 14A releases the stored elastic force and the rotation direction in which the driven shaft 41 is rotationally urged by the sliding member 15 when the first power generating spring 14A releases the stored elastic force are opposite to each other.

Next, a description is given of the pinwheel 16. The pinwheel 16 may correspond to a connecting member.

The pinwheel 16 includes a columnar wheel body 26, a connecting projection 29 and a gear part 30 provided on the wheel body 26, and a shaft hole 53 provided in the wheel body 26. The pinwheel 16 is rotatably attached to the case body 11A by inserting a wheel shaft 28 formed in the case body 11A through the shaft hole 53.

In the following description, the counterclockwise rotation (a direction indicated by arrow B1) of the pinwheel 16 in FIGS. 5A-5C through FIGS. 11A-11C is referred to as a "forward rotation," and the clockwise rotation (a direction indicated by arrow B2) of the pinwheel 16 in FIGS. 5A-5C through FIGS. 11A-11C is referred to as a "reverse rotation."

The pinwheel 16 is configured to be connectable to and disconnectable from the sliding member 15. Specifically, the connecting projection 29 of the pinwheel 16 may be connected to and disconnected from the engaging projection 49 of the sliding member 15.

The connecting projection 29 is formed to project toward the sliding member 15. Further, the engaging projection 49 is formed to project toward the pinwheel 16.

Therefore, the connecting projection 29 and the engaging projection 49 engage with each other with the rotation of the pinwheel 16, so that the sliding member 15 and the pinwheel 16 are connected. Further, the connecting projection 29 disengages from the engaging projection 49, so that the sliding member 15 and the pinwheel 16 are disconnected.

In this embodiment, when the pinwheel 16 rotates in the forward direction with the connecting projection 29 and the engaging projection 49 engaging with each other, the sliding member 15 is caused to move in the Y2 direction in the drawings. Further, when the pinwheel 16 rotates in the reverse direction with the connecting projection 29 and the engaging projection 49 engaging with each other, the sliding member 15 is caused to move in the Y1 direction in the drawings.

Further, as illustrated in FIG. 1, the connecting projection 29 is also elongated downward (in a direction indicated by arrow Z1 in FIG. 1). A lower end portion 29a of the connection projection 29 projects on the bottom side of the case body 11A through an opening formed in the case body 11A (FIG. 5C).

A first end portion 17a of the pinwheel spring 17 is connected to the lower end portion 29a. The pinwheel spring 17 may correspond to a third elastic part. As described above, the pinwheel spring 17 is accommodated in the third spring accommodating part 27 formed in the case body 11A on its bottom side. The first end portion 17a of the pinwheel spring 17 is connected to the connecting projection 29 as described above, while a second end portion 17b of the pinwheel spring 17 is connected to a boss 32 (FIG. 5C) formed in the case body 11A.

The pinwheel spring 17, which is a helical tension spring, elastically urges the connecting projection 29 in a direction indicated by arrow E1 in FIG. 5C. Therefore, the pinwheel 16 is constantly rotationally urged in the reverse rotation direction (the direction of arrow B2) by the elastic force of the pinwheel spring 17 transmitted via the connecting projection 29.

According to the switch 1 of this embodiment, size reduction is achieved by bending the pinwheel spring 17 into a substantially dog-legged shape. However, if there is room in the space for housing the pinwheel spring 17, the pinwheel spring 17 may be linearly placed.

Further, the gear part 30 is formed on the periphery of the wheel body 26. The gear part 30 is configured to mesh with a rack 58 formed in a slider 57 described above (FIG. 4B).

The toggle mechanism 18 is configured to transmit the operating force of the switch lever 12 to the pinwheel 16. The toggle mechanism 18 is attached to the toggle attachment part 25 formed in the case body 11A. The toggle mechanism 18 includes a pin 54, links 55 and 56, and the slider 57.

A first end portion 55a of the link 55 is rotatably attached to the case body 11A. A second end portion of the link 55 is rotatably attached to a first end portion of the link 56 with the pin 54. Further, the slider 57 is provided on a second end portion of the link 56.

Accordingly, by causing the installation position of the pin 54 to move in the Z1 and the Z2 direction, the slider 57 is caused to move in directions indicated by arrows X1 and X2 in the drawings inside the toggle attachment part 25. At this point, the toggle mechanism 18 serves as a force multiplying mechanism. Therefore, even when the pin 54 is caused to move in the Z1 direction with a little force, it is possible to cause the slider 57 to move in the X1 direction with significant force.

Figure 4A:
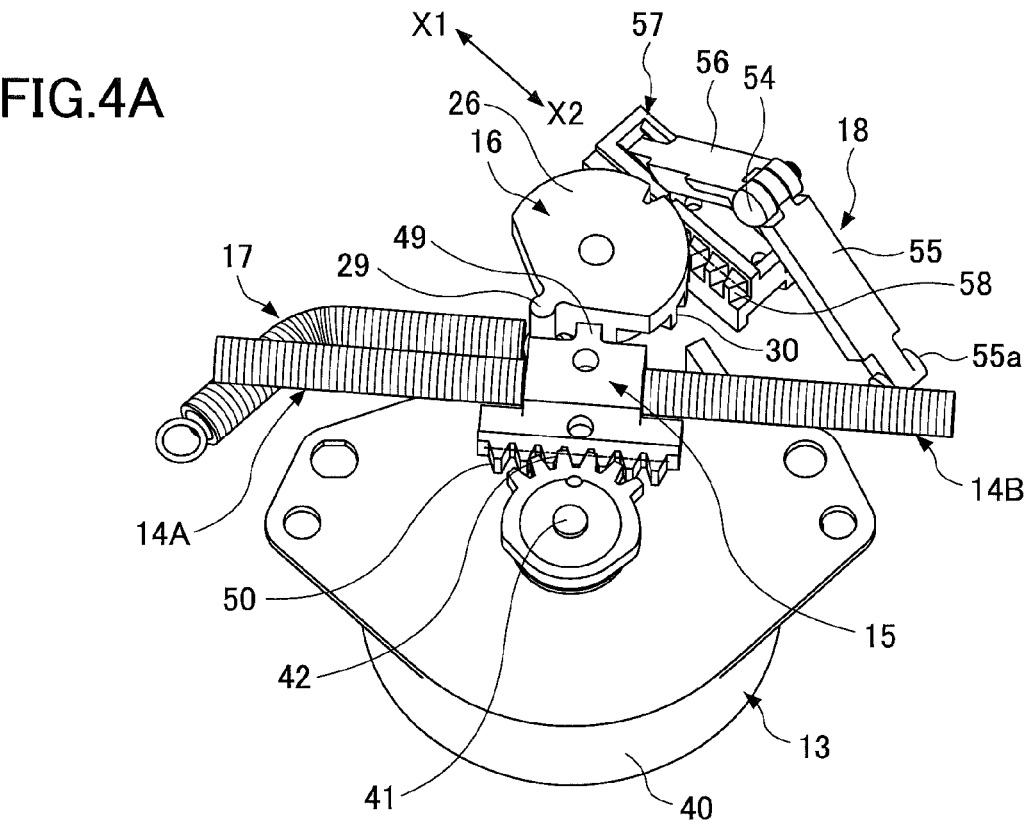
FIGS. 4A and 4B are an enlarged top-side perspective view and an enlarged bottom-side perspective view, respectively, of part of the power generating device that is an embodiment of the present invention.
Figure 4B:
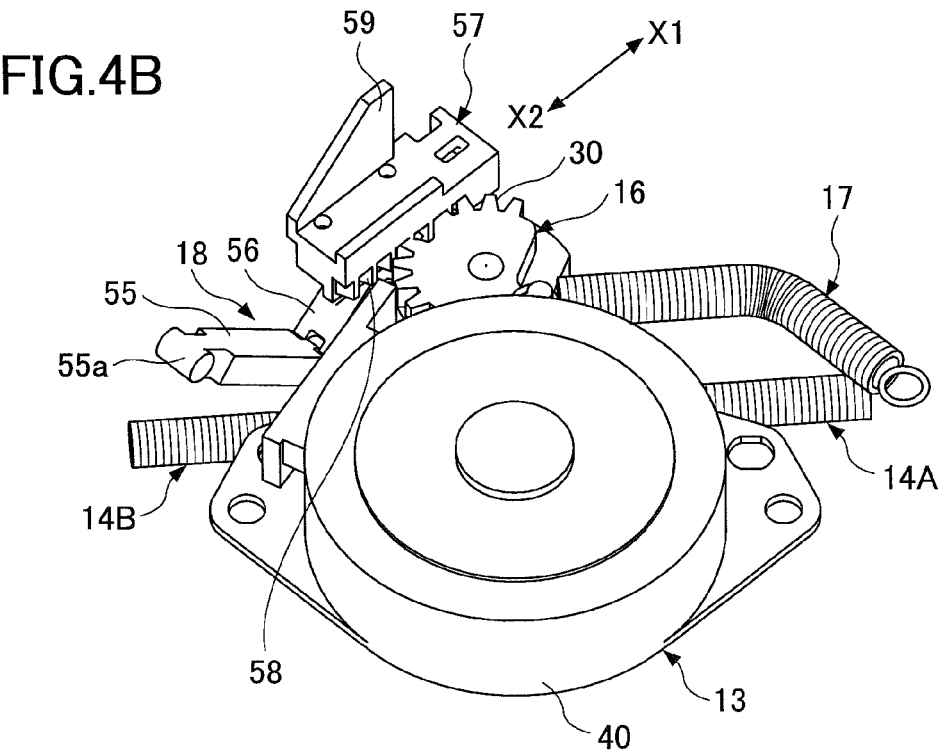

The slider 57 has the rack 58 formed in its side part (as detailed in FIG. 4B). The rack 58 is configured to mesh with the gear part 30 formed in the pinwheel 16. Therefore, the movements of the slider 57 in the X1 and the X2 direction in the drawings cause the pinwheel 16 to move in the forward rotation direction (the rotation in the B1 direction) and the reverse rotation direction (the rotation in the B2 direction), respectively.

Further, as illustrated in FIG. 4B, the slider 57 includes a switch projection 59 formed in its bottom part. The switch projection 59 is configured to project on the bottom side of the case body 11A.

As described above, the circuit board 20 is provided on the backside of the case body 11A. As illustrated in FIG. 1, a switch 60 is provided on the circuit board 20. The switch 60 is an on-off switch. By operating a switch knob 60a of the switch 60, the switch 60 is caused to turn ON or OFF.

The switch projection 59 formed in the slider 57 is configured to operate the switch 60 with the movement of the slider 57. Specifically, the switch lever 12 causes the switch 60 to turn ON immediately before the movement of the slider 57 to an end in the X1 direction in the drawings (that is, before power generation) as illustrated in FIG. 8D. The switch 60 is not necessarily limited to a mechanical switch whose ON and OFF conditions are caused to switch by an operation of its switch knob 60a, and may instead be a contactless switch whose ON and OFF switch contactlessly. For example, a light blocking detecting part (a photointerrupter) may be used as the switch 60. The switch projection 59 blocks the light of the photointerrupter with the movement of the slider 57, so that it is possible to contactlessly detect the ON/OFF state.

Contactless switches have a longer product service life than mechanical switches. Further, mechanical switches have a shorter product service life than other parts of the entire mechanism of the switch 1. Therefore, using a contactless switch as the switch 60 makes it possible to extend the product service life of the switch 1.

In the case of using a photointerrupter as a contactless switch, there may be an increase in power consumption. However, it is possible to reduce power consumption by causing the photointerrupter to operate only at the time of switch determination and otherwise to stop light emission.

Next, a description is given of operations of the power generating device 10 having the above-described configuration.

FIGS. 5A-5C through FIGS. 11A-11C illustrate operations of the power generating device 10 at the time of power generation in order the operations are performed. FIGS. 5A-5C through FIGS. 8A-8D illustrate operations at the time of pressing the switch lever 12 in the Z1 direction, and FIGS. 9A-9C through FIGS. 11A-11C illustrate operations at the time of releasing a press on the switch lever 12. In FIGS. 5A-5C through FIGS. 11A-11C, a view with a view number including "A" is a plan view, a view with a view number including "B" is a front view, and a view with a view number including "C" is a bottom view.

First, a description is given, with reference to FIGS. 5A-5C through FIGS. 8A-8D, of operations of components of the power generating device 10 at the time of pressing the switch lever 12 in the Z1 direction.

FIGS. 5A through 5C illustrate a state immediately before an operation of the switch lever 12 in the Z1 direction (hereinafter referred to as "pre-operation state"). In this pre-operation state, the switch lever 12 is swung in the C2 direction in FIG. 1.

Further, the pinwheel 16 is rotationally urged by the pinwheel spring 17, and the rotation of the pinwheel 16 is stopped with the connection projection 29 being most drawn in the E1 direction in FIG. 5C. Further, the toggle mechanism 18 has the pin 54 moved to its movement limit in the Z2 direction, and the slider 57 is moved to its movement limit in the X2 direction.

Further, in the pre-operation state, the first and second power generating springs 14A and 14B are extended with no elastic force stored. Therefore, the sliding member 15 is positioned at the substantial center of its movement range (hereinafter this position is referred to as "pre-operation position").

Here, attention is drawn to the connecting projection 29 formed in the pinwheel 16 and the engaging projection 49 formed in the sliding member 15. In the pre-operation state, the pinwheel 16 is rotated to a rotation limit in the B2 direction and is stationary. Further, as described above, the sliding member 15 is at the pre-operation position.

The connection projection 29 and the engaging projection 49 are separated in the pre-operation state. Accordingly, the sliding member 15 and the pinwheel 16 are disconnected in the pre-operation state. Therefore, the switch lever 12 and the second power generating spring 14B are disconnected as well.

FIGS. 6A through 6C illustrates a state where the switch lever 12 has started to be operated in the C1 direction (FIG. 1). With this operation, the engaging projecting part 37 formed on the switch lever 12 comes into contact with the pin 54 (the connecting part of the link 55 and the link 56) of the toggle mechanism 18 to press and urge the pin 54 in the Z1 direction. As a result, the links 55 and 56 move to enlarge an angle whose vertex is the pin 54. With this movement, the slider 57 connected to the link 56 moves in the X1 direction.

As described above, the rack 58 is formed in the slider 57 and meshes with the gear part 30 formed in the pinwheel 16. Accordingly, by pressing the switch lever 12, the pinwheel 16 is caused to rotate in the B1 direction (the counterclockwise direction in FIG. 6A) via the toggle mechanism 18.

As described above, the pinwheel spring 17 is connected to the lower end portion 29a of the connecting projection 29. The rotation of the pinwheel 16 in the B1 direction causes the pinwheel spring 17 to extend in a direction indicated by arrow E2 in FIG. 6C, so that an elastic force is stored in the pinwheel spring 17.

The rotation of the pinwheel 16 causes the connecting projection 29 to rotate as well. With this, the connecting projection 29 presses the engaging projection 49 as illustrated in FIG. 7A. As a result, the engaging projection 49 is moved and urged in the Y2 direction, so that the sliding member 15 starts to move in the Y2 direction from the pre-operation position.

The sliding of the sliding member 15 in the Y2 direction also urges the second power generating spring 14B, provided on the Y2 direction side of the sliding member 15, in the Y2 direction. However, because the outside end 14b of the second power generating spring 14B abuts against the interior wall surface of the case body 11A, the second power generating spring 14B is compressed by the sliding of the sliding member 15 in the Y2 direction to store an elastic force.

The movement of the sliding member 15 in the Y2 direction causes the driven shaft 41 to rotate via the rack 50 and the gear 42. However, the power generator 13 generates no effective electric power because the speed of the operating force of the sliding member 15 (applied by an operator) at the time of operating the switch lever 12 is low.

FIGS. 8A through 8D illustrate a state (hereinafter referred to as "first storage completion state) where the switch lever 12 has been operated to a position (hereinafter referred to as "first storage completion position) at which an elastic force that enables the driving of the power generator 13 has been stored in the second power generating spring 14B. In the first storage completion state, the switch lever 12 (the engaging projecting part 37) has been pressed in the Z1 direction, so that the sliding member 15 has moved to its movement limit position in the Y2 direction.

Further, in the first storage completion state, the pinwheel spring 17 has stored an elastic force that enables the pinwheel 16 to return to the pre-operation state and enables the sliding member 15 to move to a second storage completion position as described below.

In the switch 1 according to this embodiment, when the sliding member 15 moves in the Y2 direction, both a force as a reaction to the compression of the second power generating spring 14B (referred to as "first acting force) and a force as a reaction to the extension of the pinwheel spring 17 (referred to as "second acting force") are exerted on the switch lever 12. Therefore, if it were not for the toggle mechanism 18, it would be necessary to press the switch lever 12 with a force larger than these forces at the time of pressing the switch lever 12, thus making it difficult to operate the switch lever 12.

However, the switch 1 according to this embodiment includes the toggle mechanism 18 in a force transmission path from the switch lever 12 to the pinwheel 16. In theory, the toggle mechanism 18, which is a force multiplying mechanism, generates a maximum force in the X1 direction when the angle formed by the link 55 and the link 56 is 180 degrees. Therefore, it is possible to ensure the movement of the pinwheel 16, to which the first and the second acting force are applied, to the first storage completion position even with a small operating force F of the switch lever 12. Thus, according to the switch 1 of this embodiment, it is possible to operate the switch 1 with a small operating force F even when the first and the second acting force are applied to the pinwheel 16.

In the first storage completion state, the connecting projection 29 of the pinwheel 16 is in engagement with the engaging projection 49 of the sliding member 15, but is immediately before its separation (disengagement) from the engaging projection 49. When the switch lever 12 (the engaging projecting part 37) is further pressed in the C1 direction from the first storage completion position, the connecting projection 29 is separated from the engaging projection 49. As a result, the switch lever 12 and the second power generating spring 14B are disconnected.

When the connecting projection 29 of the pinwheel 16 is thus separated from the engaging projection 49 of the sliding member 15, the elastic force (elastic energy) stored in the second power generating spring 14B is applied to the sliding member 15, so that the sliding member 15 instantaneously moves in the Y1 direction. FIGS. 9A through 9C illustrate a state where the sliding member 15 has moved in the Y1 direction and returned to the pre-operation position.

As described above, the gear 42 and the rack 50 mesh with each other. Therefore, instantaneous sliding of the sliding member 15 in the Y1 direction causes the driven shaft 41 to rotate in the counterclockwise direction in FIG. 9A. Accordingly, the power generator 13 causes an induced electromotive force to be generated (generates electric power) with the elastic force released from the second power generating spring 14B.

At this power generation time (in particular, this power generation time is referred to as "first power generation time"), the connecting projection 29 of the pinwheel 16 is separated from the engaging projection 49 of the sliding member 15. Therefore, the elastic forces (resilience) stored in the second power generating spring 14B and the pinwheel spring 17 are applied to the sliding member 15. At this point, an elastic force large enough to drive the power generator 13 and cause the power generator 13 to generate electric power is stored in the second power generating spring 14B.

Therefore, at the first power generation time, the power generator 13 is driven with the elastic force stored in the second power generating spring 14B. By thus driving the power generator 13 with the elastic force stored in the second power generating spring 14B, it is possible to cause a stable, high-output induced electromotive force to be generated.

Next, a description is given, with reference to FIGS. 10A through 10C and FIGS. 11A through 11C, of operations of components of the power generating device 10 at the time of releasing a press on the switch lever 12.

As described above, when the sliding member 15 moves in the Y1 direction at the first power generation time, the sliding member 15 thereafter reaches the substantial center position in the Y1 and the Y2 direction (the pre-operation position). At the pre-operation position, the resilience due to the second power generating spring 14B is lost.

However, as described above, the pinwheel spring 17 is connected to the pinwheel 16, and the pinwheel spring 17 still rotationally urges the pinwheel 16 in the B2 direction. Therefore, after separation from the engaging projection 49 of the sliding member 15, the pinwheel 16 is caused to rotate in the B2 direction in the drawings by the resilience of the pinwheel spring 17.

With this rotation via the gear part 30 and the rack 58, the slider 57 moves in the X2 direction. As a result, the pin 54 of the toggle mechanism 18 moves upward to swing the switch lever 12 in the C2 direction (to the pre-operation state).

As a result of the above-described rotation of the pinwheel 16 in the B2 direction, the connecting projection 29 again engages with the engaging projection 49 of the sliding member 15. FIGS. 10A through 10C illustrate a state where the connecting projection 29 and the engaging projection 49 are engaged with each other with the rotation of the pinwheel 16. As a result, the power generator 13 is connected to the pinwheel 16 (the pinwheel spring 17) via the sliding member 15.

The operations of the power generator 13, the sliding member 15, and the pinwheel 16 after this engagement of the connecting projection 29 and the engaging projection 49 are a mirror image of the operations illustrated with reference to FIGS. 7A-7D through FIGS. 9A-9C. A description is given below of specific operations.

When the pinwheel 16 is urged by the pinwheel spring 17 to further rotate in the B2 direction from the state illustrated in FIGS. 10A through 10C, the connecting projection 29 rotates with this rotation, so that the engaging projection 49 engaged with the connecting projection 29 is moved and urged in the Y1 direction. As a result, the sliding member 15 starts to move in the Y1 direction in FIG. 10A.

Further, as a result of the sliding of the sliding member 15 in the Y1 direction, the first power generating spring 14A also is urged in the Y1 direction, so that the first power generating spring 14A is compressed to store an elastic force. This movement of the sliding member 15 is caused by the resilience of the pinwheel spring 17 alone, so that its force is not so large as to cause effective power generation. Therefore, the power generator 13 generates no effective electric power.

Figure 11C:
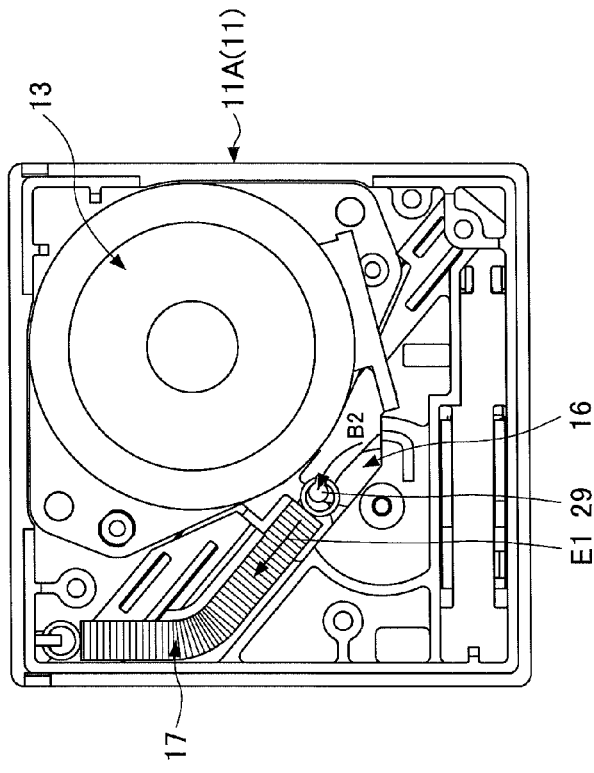
FIGS. 11A, 11B and 11C are a plan view, a front view, and a bottom view, respectively, of the power generating device and the switch, which are embodiments of the present invention, for illustrating their operations.
Figure 11A:
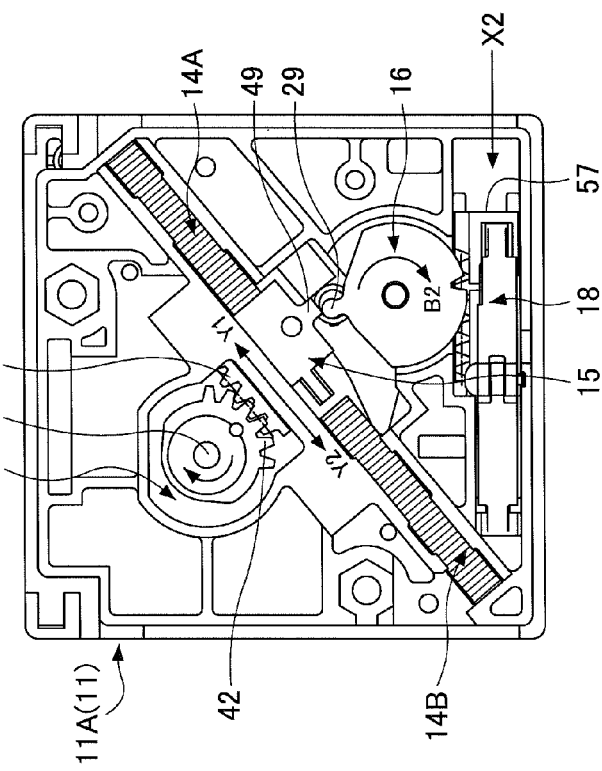
Figure 11B:
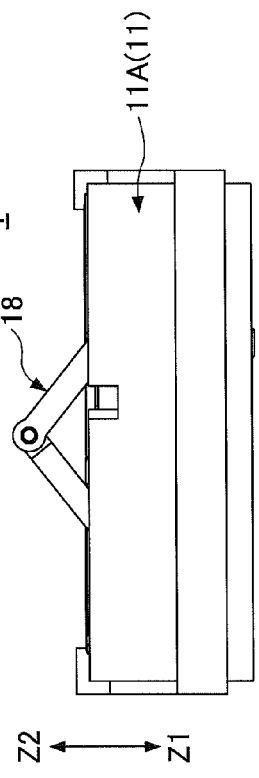

FIGS. 11A through 11C illustrate a state (hereinafter referred to as "second storage completion state) where the switch lever 12 has returned to a position (hereinafter referred to as "second storage completion position) at which an elastic force that enables the driving of the power generator 13 has been stored in the first power generating spring 14A.

In this embodiment, in the second storage completion state, the first power generating spring 14A is in its most compressed state, so that an elastic force that makes it possible to drive the power generator 13 and cause the power generator 13 to generate electric power is stored in the first power generating spring 14A. Further, in the second storage completion state, the connecting projection 29 of the pinwheel 16 is immediately before its separation from the engaging projection 49 of the sliding member 15.

When the pinwheel 16 further rotates in the B2 direction from the second storage completion position, the connecting projection 29 is separated from the engaging projection 49, so that the sliding member 15 and the pinwheel 16 are disconnected. As a result, the elastic force (elastic energy) stored in the first power generating spring 14A is applied to the sliding member 15, so that the sliding member 15 instantaneously moves in the Y2 direction. As a result, the components of the power generating device 10 return to the state illustrated in FIGS. 5A through 5C.

The above-described instantaneous sliding of the sliding member 15 in the Y2 direction causes the driven shaft 41 to rotate in the clockwise direction in the drawings. Accordingly, the power generator 13 causes an induced electromotive force to be generated (generates electric power) with the elastic force released from the first power generating spring 14A.

At this power generation time (in particular, this power generation time is referred to as "second power generation time"), the pinwheel 16 is separated from the sliding member 15. Therefore, the elastic force (resilience) stored in the first power generating spring 14A alone is applied to the sliding member 15. Further, an elastic force large enough to drive the power generator 13 and cause the power generator 13 to generate electric power is stored in the first power generating spring 14A. Therefore, a stable induced electromotive force is output from the power generator 13 at the second power generation time.

The power generator 13 generates an induced electromotive force at the first and the second power generation time as described above, so that a high-frequency communications circuit provided on the circuit board 20 transmits a radio wave to an electrical apparatus (not graphically illustrated). As a result, for example, it is possible to operate the electrical apparatus.

The switch 60 is so provided as to engage with the switch projection 59 in the first storage completion state. Therefore, as a result of the movement of the sliding member 15 to its first storage completion position (the movement limit position in the Y2 direction), the switch projection 59 that is a component of the toggle mechanism 18 engages with the switch 60 to turn the switch 60 ON as illustrated in FIG. 8D.

Thus, at the first power generation time, the power generator 13 generates electric power and the switch 60 is turned ON. Meanwhile, at the second power generation time, the power generator 13 generates electric power, while the switch 60 is turned OFF. Accordingly, it is possible to distinguish between first power generation (at the first power generation time) and second power generation (at the second power generation time) based on the presence or absence of power generation by the power generator 13 and on the ON/OFF state of the switch 60.

Accordingly, it is possible to distinguish between the first power generation due to the operation of pressing the switch lever 12 (a first operation) and the second power generation due to the operation of releasing a press on the switch lever 12 (a second operation) (the second power generation due to the resilience of the pinwheel spring 17). For example, in the case of causing the first operation to correspond to the operation of turning ON an electronic device and causing the second operation to correspond to the operation of turning OFF the electronic device, it is possible to turn ON and OFF the electronic device with the single switch 1.

Thus, in this embodiment, it is possible to distinguish between the first operation and the second operation based on the output (power generation) of the power generator 13 and a signal from the switch 60. Therefore, there is no need to separately provide a sensor for distinguishing between the first operation and the second operation in the switch 1. Accordingly, it is possible to simplify the configuration (reduce the number of parts) of the switch 1 and to reduce the cost of the switch 1.

As described above, when the pinwheel 16 is urged by the pinwheel spring 17 to rotate in the B2 direction in the state illustrated in FIGS. 10A through 10C, so that the engaging projection 49 engaged with the connecting projection 29 is moved and urged in the Y1 direction, the sliding member 15 moves in the Y1 direction in FIG. 10A.

The movement of the sliding member 15 causes the driven shaft 41 to rotate via the rack 50 and the gear 42, so that the power generator 13 generates electric power.

The power generation performed by the power generator 13 at this point is unintended, and does not contribute to the transmission of a radio wave to an electrical apparatus, which the switch 1 is supposed to perform (hereinafter, this unintended power generation is referred to as "abnormal power generation"). This abnormal power generation generates such electric power as to activate electronic circuits such as a high-frequency communications circuit and other electronic devices and electronic elements mounted on the circuit board 20 (hereinafter, these are referred to as "in-switch system"), but the generated electric power is not sufficient to cause the in-switch system to normally operate.

Therefore, the occurrence of the abnormal power generation may cause the in-switch system to end abnormally after operating halfway. (An operation due to this abnormal power generation is referred to as "abnormal power generation operation.") Such an abnormal power generation operation becomes an impediment to causing the switch 1 to properly operate.

Figure 12:
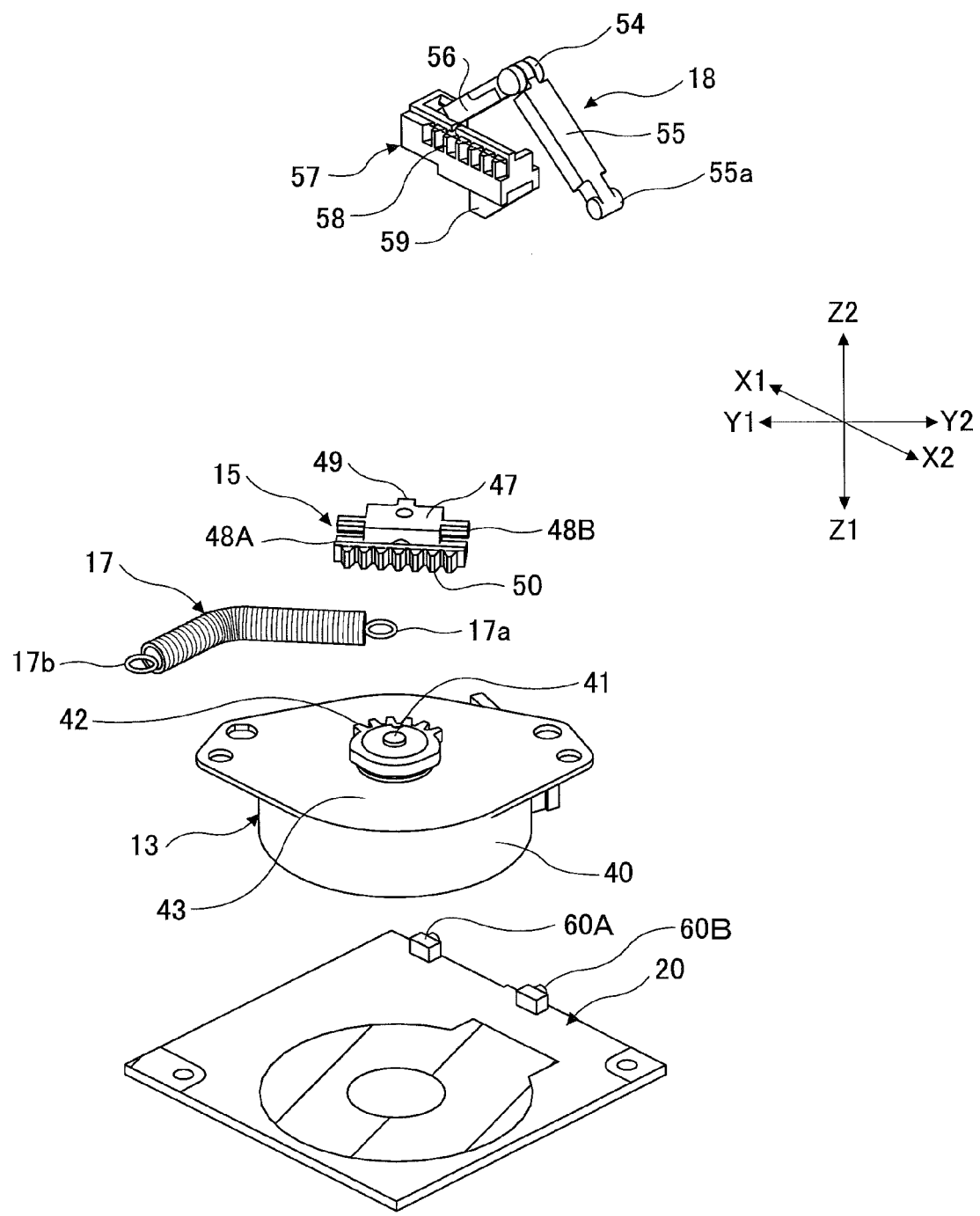
FIG. 12 is an exploded enlarged perspective view of part of the power generating device and the switch according to a variation.

FIG. 12 illustrates a variation of the configuration of the switch 1 for preventing this abnormal power generation operation.

In FIG. 12, the same elements as those illustrated in FIG. 1 through FIGS. 11A-11C are referred to by the same reference numerals, and their description is omitted. Further, FIG. 12 illustrates the power generator 13, the sliding member 15, the toggle mechanism 18, the pinwheel spring 17, and the circuit board 20 in an enlarged view, and omits a graphical representation of other elements.

In the switch 1 illustrated in FIG. 1 through FIGS. 11A-11C, the single switch 60 is provided on the circuit board 20. Meanwhile, in this variation, two switches 60A and 60B are provided on the circuit board 20.

The first switch 60A is provided at a position where the first switch 60A engages with the switch projection 59 to be turned ON when the sliding member 15 has moved to its first storage completion position (the movement limit position in the Y2 direction) as described above.

Meanwhile, the second switch 60B is so provided as to engage with the switch projection 59 in the second storage completion state. That is, as a result of the movement of the sliding member 15 to its second storage completion position (the movement limit position in the Y2 direction), the second switch 60B engages with the switch projection 59 of the toggle mechanism 18 to be turned ON.

In this variation, at the first power generation time, the in-switch system is activated in response to the power generator 13 generating electric power and the first switch 60A being turned ON. Further, at the second power generation time, the in-switch system is activated in response to the power generator 13 generating electric power and the second switch 60B being turned ON. Accordingly, the in-switch system is prevented from being activated unless the first switch 60A or the second switch 60B is turned ON.

Therefore, even when the pinwheel 16 is urged by the pinwheel spring 17 to rotate in the B2 direction in the state illustrated in FIGS. 10A through 10C so that the sliding member 15 moves to cause the power generator 13 to perform abnormal power generation, the in-switch system is prevented from being activated because the switches 60A and 60B are not turned ON at positions other than the first storage completion position or the second storage completion position. As a result, it is possible to prevent the occurrence of a malfunction in the switch 1 due to abnormal power generation, so that it is possible to increase the reliability of the switch 1.

Figure 13A:
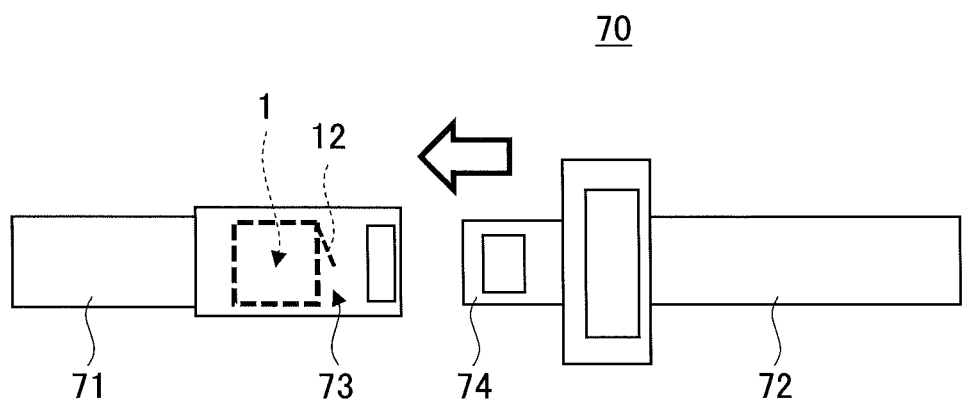
FIGS. 13A and 13B are schematic diagrams illustrating an application of the switch that is an embodiment of the present invention to the buckle of a seatbelt.
Figure 13B:
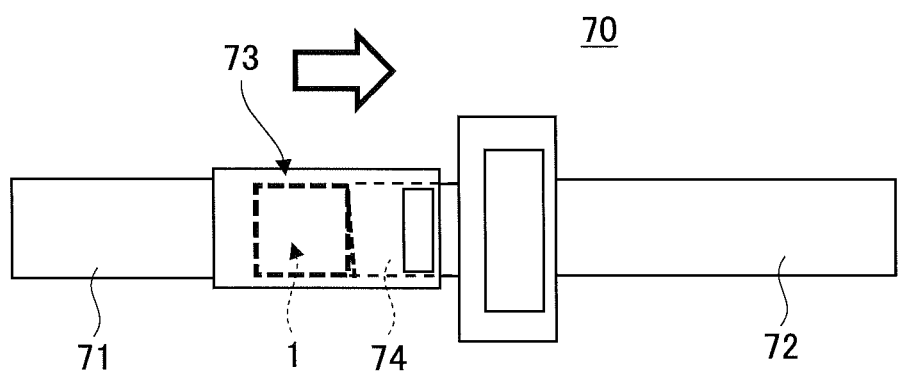

FIGS. 13A and 13B illustrate an application of the switch 1 according to this embodiment. In the embodiment illustrated in FIGS. 13A and 13B, the switch 1 is applied to a seatbelt 70.

The seatbelt 70 includes belts 71 and 72, a buckle 73 provided to the driven shaft 41, and a tongue 74 provided to the belt 72. The tongue 74 is attached to the buckle 73, so that the belts 71 and 72 are connected. The seatbelt 70 is provided to, for example, the seats of sightseeing buses.

The switch 1 according to this embodiment is provided inside the buckle 73 as illustrated in FIG. 13A. Further, the switch 1 is configured to transmit a signal to a device for checking the number of passengers provided at a driver's seat. The switch 1 is configured to have the switch lever 12 pressed by the tongue 74 attached to the buckle 73.

Therefore, as a result of the attachment of the tongue 74 to the buckle 73 as illustrated in FIG. 13A, the first power generation is performed and the switch 60 is turned ON, so that a signal indicating the attachment of the seatbelt 70 is transmitted from the switch 1 to the device for checking the number of passengers.

The switch 1 notifies the device for checking the number of passengers of the performance of the first operation (the attachment of the seatbelt 70) in response to the switch lever 12 being pressed. While the operated state of the switch lever 12 is maintained in the switch 1, the pinwheel 16 is prevented from rotating, so that the switch 1 is prevented from immediately performing the second power generation.

When the tongue 74 is detached from the buckle 73 after the attachment of the tongue 74 to the buckle 73, the press on the switch lever 12 of the switch 1 is released. As a result, the switch 1 performs the second power generation, thereby notifying the device for checking the number of passengers of the performance of the second operation (the detachment of the seatbelt 70). This makes it possible for the device for checking the number of passengers to check the number of passengers in the bus.

Examples of applications of the switch 1 of this embodiment include, in addition to the application to a seatbelt as illustrated in FIGS. 13A and 13B, applications to various devices such as security devices that detect the opening and closing of a door or the opening and closing of a window.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A power generating device, comprising:
a case;
an operating member to be operated at a time of power generation;
a power generating part configured to cause an induced electromotive force to be generated in response to a driving of a driven part thereof;
a sliding member configured to move in first and second different directions in the case and to drive the driven part by moving in the first direction or the second direction;
a first elastic part configured to be caused to store an elastic force by a movement of the sliding member in the first direction;
a second elastic part configured to be caused to store an elastic force by a movement of the sliding member in the second direction;
a connecting member configured to be connected to and disconnected from the sliding member, and to cause the sliding member to move in the second direction and the first direction by rotating in a forward direction and a reverse direction, respectively, with the sliding member being connected thereto; and
a third elastic part connected to the connecting member and configured to be caused to store an elastic force by the connecting member rotating with the movement of the sliding member in the second direction,
wherein the connecting member is caused to rotate in the forward direction by an operation of the operating member, and when the sliding member is moved to a first storage completion position by the operation of the operating member, the connecting member and the sliding member are disconnected so that the sliding member is caused to move in the first direction by the elastic force stored in the second elastic part, and
wherein the connecting member is caused to rotate in the reverse direction by the elastic force stored in the third elastic part, and when the sliding member is moved to a second storage completion position by the third elastic part, the connecting member and the sliding member are disconnected so that the sliding member is caused to move in the second direction by the elastic force stored in the first elastic part.

2. The power generating device as claimed in claim 1, wherein the connecting member includes a connecting projection, and wherein the sliding member includes an engaging projection configured to engage with the connecting projection.

3. The power generating device as claimed in claim 1, further comprising:
   a toggle mechanism configured to transmit an operating force of the operating member to the connecting member.

4. The power generating device as claimed in claim 3, further comprising:
   a switch provided in the case and configured to be operated by the toggle mechanism when the sliding member reaches the first storage completion position.

5. The power generating device as claimed in claim 3, further comprising:
   a switch provided in the case and configured to be operated by the toggle mechanism when the sliding member reaches the second storage completion position.

6. A switch, comprising:
   the power generating device as set forth in claim 1; and
   an electronic circuit configured to operate with the induced electromotive force caused to be generated by the power generating device.

\* \* \* \* \*